( 12 ) United States Patent
Hryniewicz et al.

(10) Patent No.: US 6,859,603 B2
(45) Date of Patent: Feb. 22, 2005

(54) METHOD FOR FABRICATION OF VERTICALLY COUPLED INTEGRATED OPTICAL STRUCTURES

(75) Inventors: John Hryniewicz, Columbia, MD (US); Philippe Absil, Braine l'Alleud (BE); Brent Little, Greenbelt, MD (US); Oliver King, Annapolis, MD (US); Ping-Tong Ho, Rockville, MD (US)

(73) Assignee: University of Maryland, College Park, Riverdale, MD (US)

( * ) Notice: Subject to any disclaimer, the term of this patent is extended or adjusted under 35 U.S.C. 154(b) by 67 days.

(21) Appl. No.: 10/343,150

(22) PCT Filed: Mar. 5, 2001

(86) PCT No.: PCT/US01/04943

§ 371 (c)(1),
(2), (4) Date: Jan. 29, 2003

(87) PCT Pub. No.: WO02/10814

PCT Pub. Date: Feb. 7, 2002

(65) Prior Publication Data

US 2004/0022513 A1 Feb. 5, 2004

Related U.S. Application Data

(60) Provisional application No. 60/222,356, filed on Aug. 1, 2000, and provisional application No. 60/259,698, filed on Jan. 5, 2001.

(51) Int. Cl.[7] .......................... G02B 6/10; C03B 37/022
(52) U.S. Cl. .......................... 385/131; 385/129; 65/386
(58) Field of Search .................................. 385/129–132, 385/50, 14; 65/385, 429

(56) References Cited

U.S. PATENT DOCUMENTS 4,923,264 A * 5/1990 Langer et al. .................. 385/2
5,878,070 A * 3/1999 Ho et al. ...................... 372/92
6,185,033 B1 * 2/2001 Bosc et al. .................. 359/254
6,303,978 B1 * 10/2001 Daniels et al. .............. 257/642
6,411,752 B1 * 6/2002 Little et al. .................... 385/17

OTHER PUBLICATIONS

D.V. Tishinin et al., "Vertical Resonant Couplers with Precise Coupling Efficiency Control Fabricated by Wafer Bonding", IEEE Photonics Technology Letters, Aug. 1999, p. 1003–1005, vol. 11, No. 8.
P.P. Absil et al., "Vertically Coupled Microring Resonators Using Polymer Wafer Bonding", IEEE Photonics Technology Letters, Jan. 2001, p. 49–51, vol. 13, No. 1.
R. Grover et al., "Parallel–Cascaded Semiconductor Microring Resonators for High–Order and Wide–FSR Filters", Journal of Lightwave Technology, May 2002, p. 900–905, vol. 20, No. 5.
R. Grover et al., "Vertically Coupled GaInAsP–InP Microring Resonators", Optics Letters, Apr. 15, 2001, p. 506–508, vol. 26, No. 8.

* cited by examiner

Primary Examiner—Rodney Bovernick
Assistant Examiner—Juliana K. Kang
(74) Attorney, Agent, or Firm—Rosenberg, Klein & Lee

(57) ABSTRACT

A manufacturing process is provided for fabrication of vertically coupled integrated photonic devices by projection lithographic technique. A multi-layered structure is formed which includes a pair of core waveguiding layers separated by a coupling interlayer and sandwiched between cladding layers. Prior to forming optical features in the core layers, alignment marks are etched completely through the whole multi-layered structure with the alignment marks being visible on both sides of the multi-layered structure to a conventional projection stepper. After the alignment marks are formed, a "bottom level" optical features are made through the bottom cladding layer, bottom core layer, and portion of intervening coupling layer. The formed sample is then bonded by a polymer to a carrier and a "top level" optical features are defined through the top cladding, top core layer, and portion of the intervening coupling layer.

20 Claims, 11 Drawing Sheets

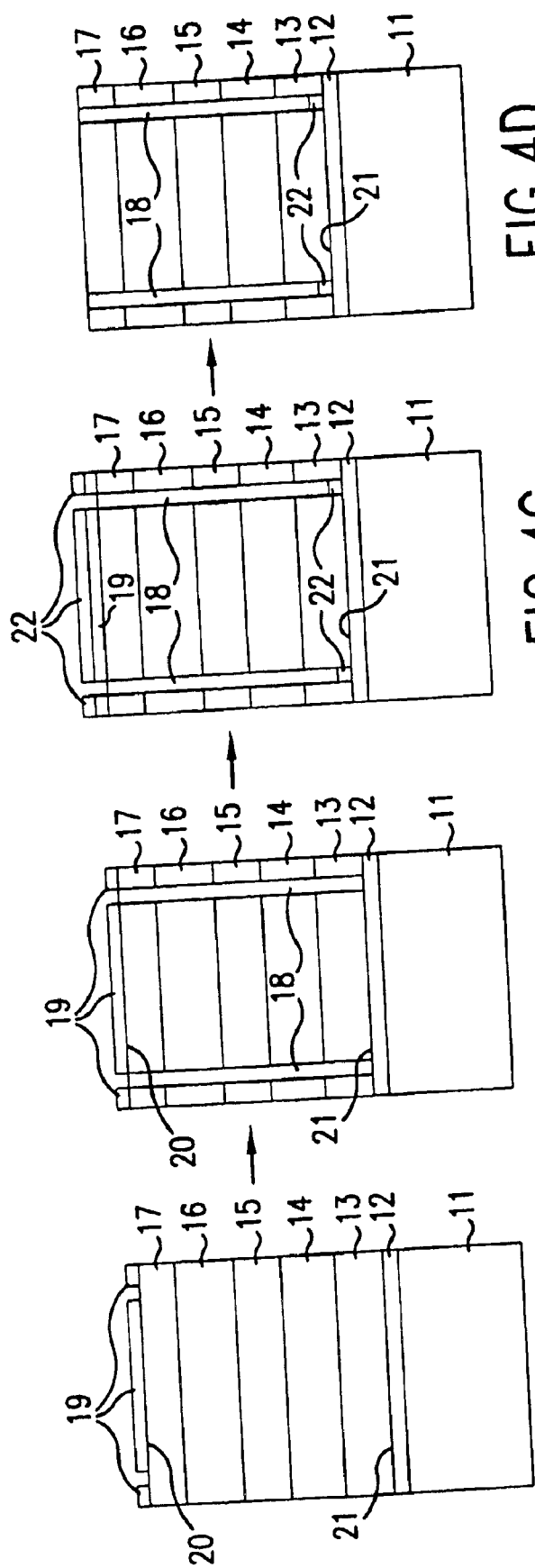

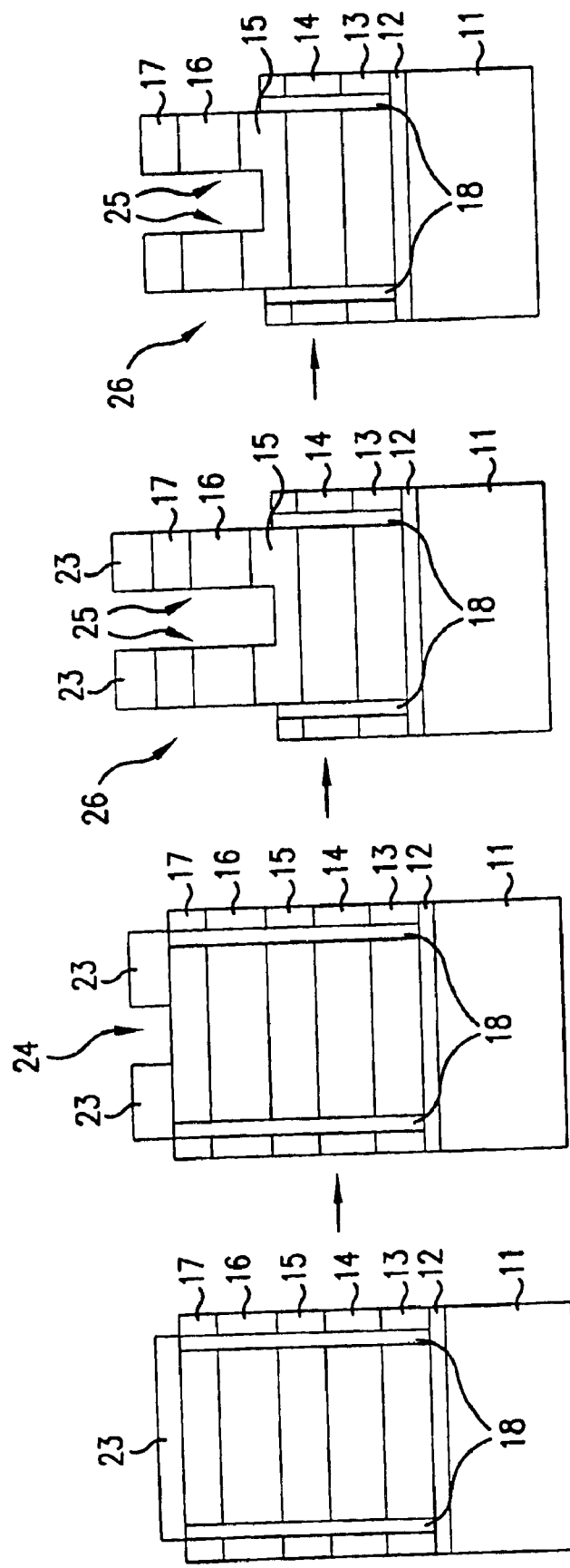

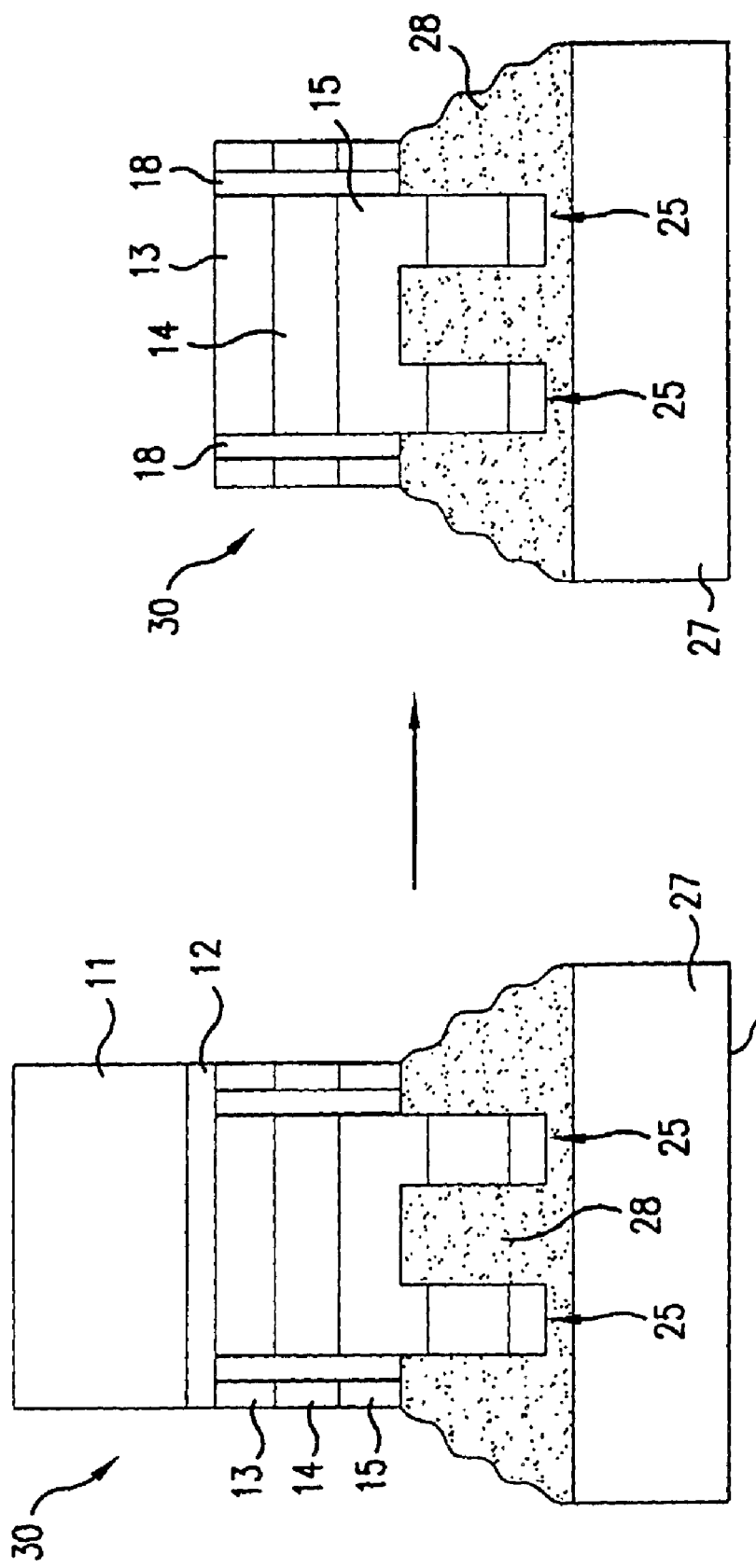

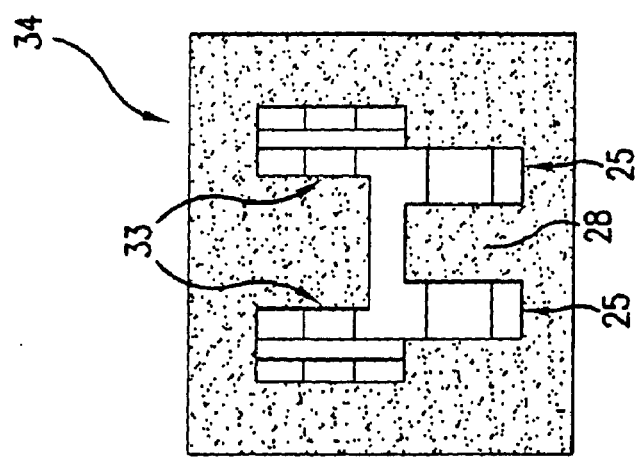
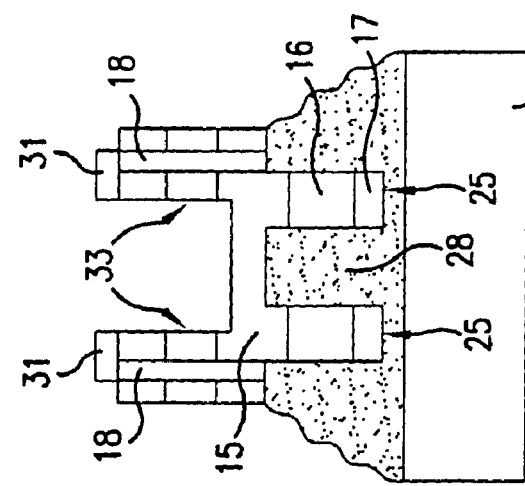
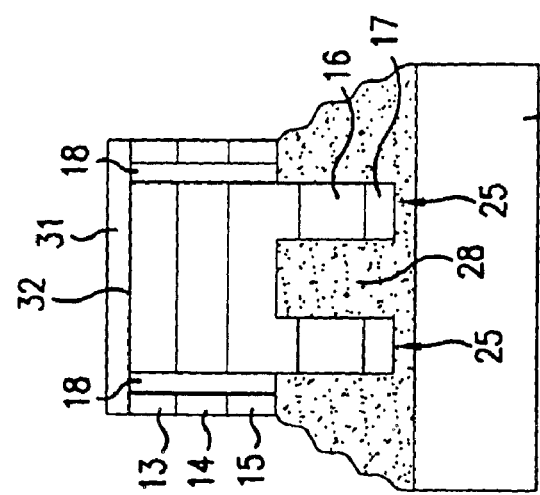

METHOD FOR FABRICATION OF VERTICALLY COUPLED INTEGRATED OPTICAL STRUCTURES

This application claims benefit of Provisional Applications No. 60/222,356 filed Aug. 1, 2000 and 60/259,698 filed Jan. 5, 2001.

This invention was made with Government support under Contract MDA90497C0476 awarded by the National Security Agency. The Government has certain rights in this invention.

FIELD OF THE INVENTION

The present invention relates to fabrication of integrated photonic devices; and particularly, to a technique for fabrication of integrated optical devices in which highly confined optical components, such as optical waveguides, micro-ring resonators, couplers, interferometers, etc., are coupled vertically, as opposed to lateral coupling.

Even more particularly, the present invention relates to a technique for fabrication of vertically coupled integrated optical devices by applying the advantages of projection photolithography, substrate removal and low temperature polymer binding to attain optical integrated structures of high quality.

The present invention is further directed to a method for fabrication of various integral optical waveguide systems employing a technique for deep etching of alignment marks thus attaining increased alignment quality of the device's design which makes it possible to fabricate vertically coupled highly confined optical waveguide devices by means of conventional projection lithography in a process compatible with low cost mass production.

The present invention further is related to fabrication of integrated optical waveguide devices which comprise at least two waveguiding core regions separated by an inner layer region which is sandwiched between cladding regions. All regions of the device extend in vertical mutual disposition to form a vertically coupled ensemble. The entire ensemble is then encapsulated within a polymer. Independent optical components of the device are formed in the waveguide core regions by etching of waveguiding core regions in a predetermined sequence in accordance with a desired pattern wherein the relative alignment of the formed optical components is achieved by special deeply etched alignment marks which are fabricated prior to the etching of the waveguiding core regions.

BACKGROUND OF THE INVENTION

Integrated photonics has proved to be a useful technology for transmitting, receiving, routing and processing of information in optical form as is widely documented in an extensive literature. Typically, integrated photonic devices require the controlled coupling of light between waveguides formed in an integrated chip. It is known in the prior art that a useful method for performing this coupling is to position two waveguides in parallel fashion with a controlled separation allowing light to couple the waveguides 1 and 2 across the gap 3 formed therebetween as shown in FIG. 1. The properties of this type of coupling are determined by the material, shape and dimensions of the waveguides, cladding parameters, and the dimension of the coupling gap 3 which is particularly important in determining the coupling strength between the waveguides 1 and 2.

Typically, integrated photonics fabrication is based on the planar processing technology developed for semiconductor integrated circuits, while layers of material are deposited or grown upon largely planar substrate surfaces. Structures are patterned along the surface of the plane using a succession of lithographic processes combined with various etching, deposition, alloying, implantation and other well-known techniques.

Integrated optical waveguides may be fabricated in the following ways: a) with dimensions perpendicular to the plane (which is referred to herein as the vertical direction) generally determined by the thickness of grown or deposited layers with values being set by the growth or deposition process parameters, or (b) with the in-plane dimensions (which are referred to as lateral directions) generally determined by lithographic patterns as they define the regions where other additive, subtractive or modifying processes are applied.

It has been noted that coupling of two waveguides 4 and 5 in a manner that the waveguide separation, or coupling gap 6 is oriented in the vertical direction (referred to as vertical coupling) shown in FIGS. 2A and 2B has several advantages.

Initially, the waveguide separation in vertically coupled structures is determined by a layer growth or deposition process rather than by a lithographic process. Since it is frequently possible to control the thickness and material characteristics of a grown or deposited layer to a higher degree of accuracy and precision than that of a lithographic process, an enhanced control over the coupling strength between vertically separated waveguides is attained.

Secondly, vertical coupling geometry has an advantage of greatly enhanced alignment tolerance between the waveguides to be coupled. As described previously, the coupling strength between two waveguides is a highly dependent function of the waveguide separation and in many cases the relationship has an exponential dependence.

In conventional integrated couplers in which two waveguides 1 and 2 are separated in a lateral direction (as shown in FIG. 1), a relatively small variation in the waveguide separation 3 due to lithographic nonuniformity or misalignment may cause a considerable change in the coupling strength. In the case of vertical coupling shown in FIGS. 2A and 2B, the maximum coupling strength occurs when two waveguides 4 and 5 are optimally aligned in the lateral direction. At such an optimum point, the dependence of coupling on misalignment (lateral displacement 7) is stationary to a first order (the first derivative is zero at a maximum point). Thus, the coupling can be made relatively insensitive to small errors in the lateral alignment 7 of vertically coupled waveguides.

Microring resonators proved to be promising building blocks for very large-scale integrated optics. In the past few years, single microring resonators laterally coupled to a waveguide have been fabricated in $Si-SiO_2$ and GaAs—AlGaAs. Advanced functions thereof have been demonstrated such as high-order filtering for DWDM applications, notch filters and wavelength conversion. These devices were based on lateral coupling between the waveguides and the ring fabricated by lithography. In these devices it is critical to make the separation between the waveguides and the microring smaller than 0.3 $\mu$m. Disadvantageously, lithography may fail to deliver such preciseness of parameters, thus making reproducible bandwidth and high power dropping efficiency of the integrated optical devices difficult to achieve.

This problem is substantially alleviated with vertical coupling by controlling the sensitive separation between optical components with material growth or deposition, and incorporating the inherently symmetric structure of the integral devices. Waveguides and ring resonators that take advantage of vertical coupling have been demonstrated which were fabricated in compound glass, silica and in semiconductors. The process included sequential deposition (regrowth) of several waveguiding layers, one on top of another, with patterning of each layer before deposition (regrowth) of a subsequent layer. This technique required multiple redeposition (or regrowth) and planarization which has suffered from unwanted complexity.

A regrowth-free fabrication technique was developed which allowed fabrication of vertically coupled structures in semiconductors using wafer bonding, substrate removal and infrared backside contact alignment. The regrowth-free technique, however has suffered from a number of drawbacks. First, the method used contact lithography techniques outfitted with infrared alignment systems which are able to do accomplish alignments and exposures, however, the method has serious limitations in resolution and inter-level alignment accuracy as compared to projection systems. Due to the limitations in resolution and alignment presented by infrared backside-aligned contact photolithography, it was difficult to attain highly confined vertically coupled structures.

Secondly, due to the fact that alignment marks on the original top surface of the structure would not be visible to a conventional projection stepper after the wafer bonding and substrate removal process, the direct write electron beam lithography or deep UV photolithography was necessitated to achieve a deep sub-micron alignment tolerance which was still a requirement between waveguides even in the case of vertically coupled devices. Thus, this technique was not compatible with projection lithography which is a known technique well suited for widespread use of large scale silicon integrated circuit fabrication.

It has become apparent that a simpler technique for fabrication of integrated photonic devices compatible with projection lithography for manufacturing of highly confined waveguides in semiconductors with the sub-micron alignment tolerance between waveguides is still necessary in the field of integrated photonics.

SUMMARY OF THE INVENTION

It is an object of the present invention to provide a fabrication process for manufacturing of vertically coupled optical integrated waveguide devices having a high degree of vertical confinement and isolation of the optical elements by means of projection lithography meeting the requirement of sub-micron alignment tolerance between the optical elements.

It is another object of the present invention to provide a process for fabrication of vertically coupled optical waveguide integrated devices using deeply etched alignment marks visible to a conventional projection I-line projection stepper where the alignment scheme of the present invention provides for a high quality layer to a layer alignment with an alignment tolerances limited to below 0.25 microns.

It is still an object of the present invention to provide a manufacturing process for fabrication of vertically coupled optically integrated structures comprising at least two waveguide core layers separated by interlayers and sandwiched between cladding layers which are encapsulated as an entire ensemble within a low index polymer. Such a structure allows each of the waveguiding cores to be individually optimized in dimension and composition for their particular function. In this manner, the technological process provides for complete patterning access to the waveguiding layers without incurring the difficulties encountered with a single side patterning approach of the prior art.

According to the teaching of the present invention, a method for fabrication of vertically coupled integrated photonics devices is provided which comprises the steps of:

(a) forming a multi-layered structure having at least a pair of waveguiding core layers separated by a coupling layer and sandwiched between a pair of cladding layers, (b) forming alignment marks extending through the whole width of the multi-layered structure, (c) forming first waveguiding features at the bottom level of the multi-layered structure by through etching the respective cladding layer, waveguiding core layer and partially through the coupling layer in accordance with a first pattern, and (d) forming second waveguiding features at the top level of the multi-layered structure by through etching another cladding, waveguiding core layer and partially the coupling layer in accordance with a second pattern so that at both the bottom and the top levels, the features are aligned to the alignment marks which are easily identifiable at both the top and bottom surfaces of the multi-layered structure by a conventional projection stepper. Projection lithography techniques are well-suited to the method of the present invention.

It is important that the coupling layer is not removed completely by etching the waveguiding features on the top and bottom levels of the multi-layered structure. Preferably, the remaining portion of the coupling layer (portion not removed) is not thicker than 0.3 $\mu$m which provides optical isolation between the waveguiding features as well as adding mechanical strength to the structure.

After the features of the bottom level of the multi-layered structure have been defined as provided in step (c), the entire structure is covered with a low refractive index polymer. The substrate on which the multi-layered structure is deposited or grown, is removed in order to spare the top level surface of the multi-layered structure for further patterning by means of projection lithography. After the top level features have been defined, the low refractive index polymer is positioned on the top level features which completely envelopes the entire device therein.

Viewing another aspect of the present invention, there is provided a vertically coupled integrated photonic device which includes:

a multi-layered structure having at least a pair of waveguiding core layers patterned independently and in predetermined sequence to define a top level and bottom level waveguiding features, respectively, a coupling layer spacing said top layer and bottom layer level waveguiding features, a pair of cladding regions sandwiching the waveguiding layers therebetween, and a low refractive index polymer completely encapsulating the multi-layer structure therewithin.

It is important to the concept of the photonic device of the present invention that a portion of the coupling layer always remains between the vertically spaced waveguiding core layers for increased optical isolation therebetween as well as to add mechanical strength to the overall structure. The overall thickness of the coupling layer is generally maintained to a dimension of approximately 0.3 microns or less.

BRIEF DESCRIPTION OF THE DRAWINGS

FIGS. 4a–4d show schematically the succession of technological steps for forming the alignment marks in the multi-layer structure of the present invention;

FIGS. 5a–5d show schematically the succession of technological steps for forming "bottom level" waveguide patterns in the multi-layer structure of the present invention;

FIGS. 6a–6b show schematically the substrate removal and polymer bonding of the structure shown in FIG. 5d to a carrier substrate;

FIGS. 7a–7c show schematically the sequence of operations of the top level patterning and the carrier removal;

FIG. 12A represents a resonance comparison between TM and TE polarization, while FIG. 12B represents throughport and drop port TM spectra;

DETAILED DESCRIPTION OF THE PREFERRED EMBODIMENT

Figure 1:
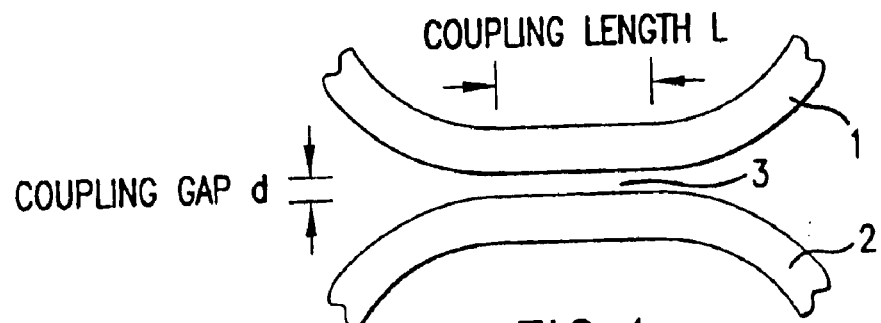
FIG. 1 is a schematic representation of a laterally coupled waveguide structure of the prior art.
Figure 2A:
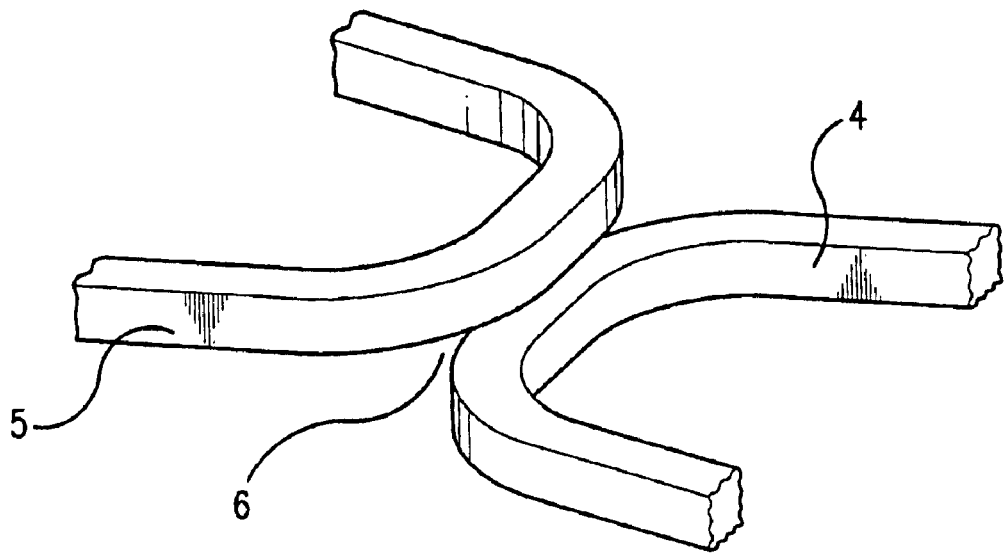
FIG. 2A is a perspective view of a vertical waveguide coupler of the prior art.
Figure 2B:
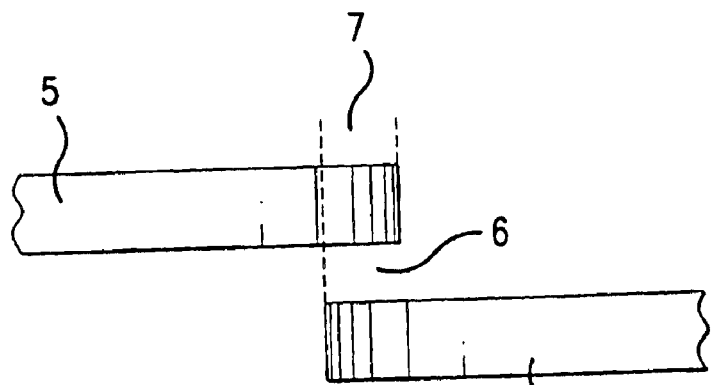
FIG. 2B is a schematic representation of the vertical waveguide coupler of FIG. 2A.
Figure 3:
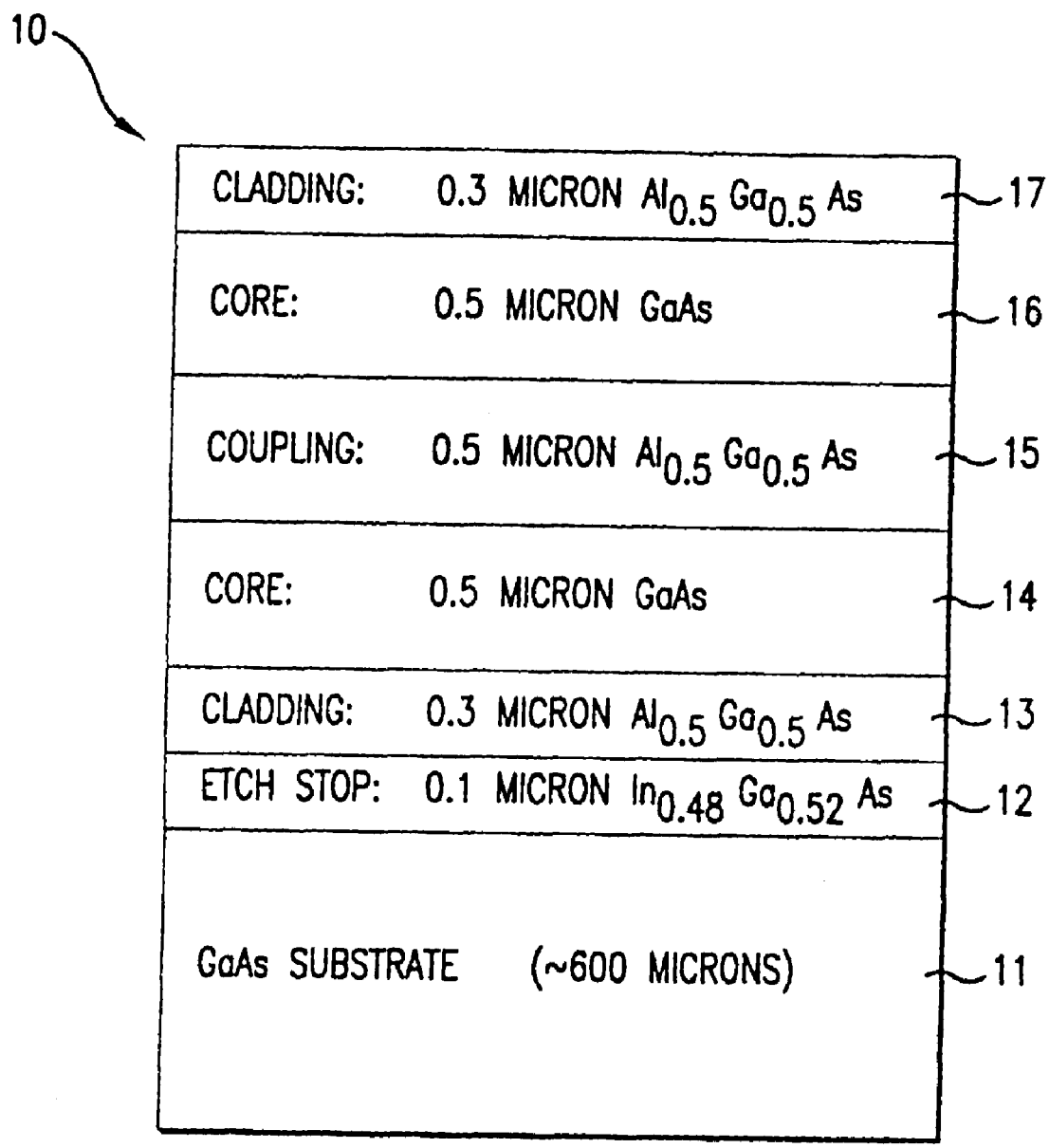
FIG. 3 is a schematic cross-section of a multi-layer structure in which a vertically coupled integrated optical device of the present invention is formed.

Referring to FIG. 3, the fabrication process of the present invention is initiated by formation of an initial multi-layer structure 10 positioned above a semiconductor substrate 11 which is separated therefrom by an etch stop layer 12 formed on the top of the semiconductor substrate 11. The multi-layered structure 10 includes a first cladding layer 13 formed on the top of the etch stop layer 12, a first core layer 14 formed on the top of the first cladding layer 13, a coupling layer 15 formed on the top of the first core layer 14, a second core layer 16 formed on the top of the coupling layer 15 separated from the first core layer 14 by the coupling layer 15, and a second cladding layer 17 formed on the top of the second core layer 16.

Thus formed, multi-layer structure 10 includes a pair of core layers separated by the coupling layer and sandwiched between a pair of cladding layers. It is important to the understanding of the present invention that formation of more than two core layers separated by a respective coupling layer is also contemplated in the scope of the present invention and can be easily performed for the photonic integral devices which would include more than two vertically coupled waveguide structures.

Therefore, it is clear that the structure of FIG. 3 which would comprise a pair of core layers 14 and 16 separated by the coupling layer 15 is presented for the sake of clarity and ease of understanding of this particular example of the fabrication process and the structure of the present invention and not for the purposes of limiting the scope of the invention.

The layer thicknesses and compositions are chosen to provide optical waveguiding in the higher refractive index core layers 14 and 16 within a lower index cladding layers 13 and 17. The refractive index and thickness of the coupling layer 15 are chosen to provide an appropriate amount of coupling between a waveguide feature formed in the first core layer 14 and a waveguide feature formed in the second core layer 16 for the range of waveguide transverse dimensions to be used in the example device, which is intended to produce single transverse mode waveguides in the completed device. Optical waveguide mode software is used to determine the approximate values of the layer and device design parameters which can be finely tuned through experiment.

In the example device discussed herein, a GaAs substrate was used with the approximately 600 microns thickness, on the top of which a 0.1 micron $In_{0.48}Ga_{0.52}As$ etch stop layer 12 was epitaxially grown or deposited by techniques known to those skilled in the art. A first cladding layer 13 of 0.3 micron $Al_{0.5}Ga_{0.5}As$ was epitaxially grown or deposited on the top of the cladding layer 13. 0.5 micron GaAs first core layer 14 was epitaxially grown or deposited on the top of the first cladding layer 13 and the 0.5 micron $Al_{0.5}Ga_{0.5}As$ coupling layer 15 was grown or deposited on the top of the first core layer 14. Then, 0.5 micron GaAs second core layer 16 was epitaxially grown or deposited on the top of the coupling layer 15, and finally a second cladding layer 17 of 0.3 microns $Al_{0.5}Ga_{0.5}As$ was grown or deposited on the top of the second core layer 16. Multi-layer structure 10 as provided constituted a symmetrical structure where the axis of symmetry extended through the coupling layer 15. It is however to be understood that despite of the fact that in the example structure shown in FIG. 3 having a pair of identical first and second core layers 14 and 16, as well as substantially identical first and second cladding layers 13 and 17 (both composition and thickness-wise), these layers are independent each from the other and the first and second core layers, as well as first and second cladding layers can be made with different and distinct composition content as well as different thickness, as needed for an intended integral photonics device.

The initial multi-layer structures 10 shown in FIG. 3 after being formed, are cleaved along crystal planes into convenient sized pieces (13.5 mm) for subsequent processing as will be described in further paragraphs.

After the multi-layer structure 10 has been formed, alignment mark patterns are created. It is an important feature of the manufacturing process of the present invention that the alignment mark pattern is formed to extend substantially through the entire multi-layer structure 10, i.e., extending through the first cladding layer 13, first core layer 14, the coupling layer 15, the second core layer 16, and the second cladding layer 17 as best shown in FIGS. 4B–4D.

Such a formation of the alignment mark pattern is an important feature of the manufacturing process for fabrication of integral photonic devices with vertically coupled optical components, since it takes advantage of conventional projection lithography techniques as well as giving independent access directly to both core layers of the structure for forming (independently each from the other) waveguiding patterns in the core layers.

In order to form the alignment marks (or alignment keys) 18, a photolithography was performed on the multi-layer structure 10 using 2.1 micron thick I-line positive photoresist, exposed on a 10×I-line stepper (lens N.A. 0.315). This process is well-known to those skilled in the art and therefore is not discussed herein in detail.

As shown in FIG. 4A, a positive photoresist 19 was deposited on the top of the cladding layer 17 and was exposed through a mask which contained a pattern corresponding to reference alignment marks suitable for the alignment of subsequent patterns as well as reference verniers for evaluation of alignment accuracy. Resist backing and development were done according to the resist manufacturer's recommendations. The stepper focus and exposure values have been optimized prior to the use in the process of the present invention using a resolution test pattern; the stepper base line alignment was also checked. The sample was positioned on the stage and aligned with a crystal cleavage plane parallel to the stepper stage travel to facilitate later cleavage of the device bars as known to those skilled in the art.

After the alignment marks pattern has been formed in the photoresist 19 on the top of the cladding layer 17, as shown in FIG. 4A, the samples were etched to define the alignment marks 18 through the layers (first and second cladding layers 13 and 17, first and second core layers 14 and 16, and the coupling layer 15), as shown in FIG. 4B. The etching depth is sufficient (2.1 microns) to allow the alignment mark 18 to be seen from the front surface 20 as well as from a back surface 21 of the multi-layer structure 10 after removal of the substrate 11 and the etch stop layer 12, as will be described in following paragraphs. Etching was performed using chlorine/boron trichloride inductively coupled plasma (ICP) etching, using the photoresist as a mask.

After the alignment marks 18 have been etched through the multi-layer structure 10, a metal film 22 consisting of titanium (10 mm layer) and gold (90 nm layer) were deposited on the sample using electron beam evaporation, as shown in FIG. 4C. The sample was placed in warm n-methyl pyrolidinone (NMP) to dissolve the photoresist mask 19 and lift off or remove the area of metal film 22 on the top surface 20 of the sample. Metal film 22 remained within the etched alignment marks 18, specifically on the bottom thereof, as shown in FIG. 4D, and contributed to the high visibility of the alignment marks 18 in subsequent alignment steps. The sample was further cleaned using solvent rinsing in acetone, methanol and isopropanol.

After the alignment marks 18 have been formed, the photolithographic process was performed to form a "bottom level" of the overall device features. Referring to FIG. 5A, a layer of the photoresist 23, aligned to the sample alignment marks 18 was deposited and exposed through a photo mask to define the "bottom level" waveguide features.

The pattern formed in the photoresist level 23 was designed to leave the photoresist in the areas 24 where the optical waveguide features were intended to be formed in the core layer 16, as shown in FIG. 5B. The bottom level waveguide pattern were then etched using ICP (inductively coupled plasma) etching to a depth of 0.95–1.0 micron using the photoresist 23 as a mask. This etching step removed the second cladding layer 17 in predetermined areas, second core layer 16, and a portion of the coupling layer 15 to form highly confined waveguide features 25, as shown in FIG. 5C. After the etching, the photoresist 23 was removed to form the sample 26 with the "bottom level" waveguide features 25 extending from the coupling layer 15,d as shown in FIG. 5D.

The etching was performed in a three step process:

1. The sample 26 was exposed to an oxygen sample cleaning process in a reactive ion etching chamber for two minutes;

2. The sample 26 was soaked in warm n-methyl pyrolidinone (NMP) at 70 centigrade for at least 10 minutes, and then rinsed with organic solvents, such as acetone, methanol, and isopropanol; and 3. The sample 26 was run for 2–3 minutes through the oxygen plasma strip process at high pressure and high power to remove residual photoresist 23 on the features 25.

After the "bottom level" features have been formed, a GaAs chip 27 was prepared to be used as a carrier, which was cleaved to be somewhat larger in area than the sample shown in FIGS. 3–5D. The carrier 27 was cleaned using an organic solvent rinse, and an adhesion promoter (Dow Chemical Company AP3000 Cyclotene Adhesion Promoter) was applied to the top surface of the GaAs carrier 27, which was spun at 2000 rpm (rotations per minute) for the duration of 30 seconds. The adhesion promoter was also applied to the sample in process to cover the "bottom level" waveguide features 25. The adhesion promoter applied to the sample was also spun to uniformly spread it over the sample 26.

Further, a predetermined quantity, specifically a drop of benzocyclobutene (BCB) Dow Chemical Cyclotene 3022-57 was deposited on the GaAs carrier 27 and the device sample 26 was inverted with features 25 being downwardly extending and placed onto the carrier 27, as shown in FIG. 6A, with the crystal axis of the carrier 27 and the sample 26 roughly pre-aligned. Both the sample 26 and the carrier 27 were gently pressed to provide a uniform BCB layer 28 between the sample 26 and the carrier 27. Excess BCB was removed from the sides of the carrier 27, and careful handling was used to insure that the entire top surface of the carrier 27 was covered with the BCB 28 to act as a protection layer in subsequent wet etching.

Care was taken to maintain the unbonded surface 29 of the carrier 27 free of BCB. The ensemble 30 of the carrier 27, BCB 28, and the sample 26 was placed on a 10° angled aluminum block (not shown in the Drawings). The whole ensemble 30 was heated to 100° C., in order to allow the sample 26 the ability to slide down on the slope of the aluminum block and self-align to the crystal axis of the carrier 27 when the BCB reached 100° C. where the BCB viscosity was reduced and the sample 26 became somewhat free to slidingly displace.

The ensemble 30 containing the carrier 27, the sample 26 and the BCB layer 28 holding them together aligned each to the other, was then placed on a quartz holder in a nitrogen-purged cube furnace that was initially at room temperature to be cured therein. Curing was performed in the following sequence:

A. Temperature ramp rising from 25C to 100C in 60 minutes, with a soak for 30 minutes;

B. Temperature ramp rising from 100C to 150C in 30 minutes, with a soak for 30 minutes;

C. Temperature ramp from 150C to 200C in 30 minutes, with a soak for 2 hours;

D. Cool down the chamber manually to room temperature to avoid thermal shock when removing the ensemble 30 from the furnace.

After curing of the ensemble 30 as depicted in FIG. 6A, the substrate 11 was removed using either a chemo-mechanical (bromine-methanol) process or an acid etch process. The ensemble 30 was mounted on a quartz disk with wax if the removal step used, (1) the bromine/methanol technique, or (2) with clear wax if the removal operation used acid technique.

The removal of the substrate 11 was performed in three steps:

A. Fast etch was performed with the chemo-mechanical process (Bromine/Methanol with lightly loaded motion across a soft pad or Teflon surface) until the substrate 11 was about 100 $\mu$m thick (below this thickness range the multi-layered structure might crack). A 3% bromine in methanol solution and moderate speed on a MiniMet polisher resulted in 25 $\mu$m/min etch rate. The uniformity of this process is not critical due to the highly selective etch stop to be used in the next step.

Another fast etch can be purely chemical using a $H_2SO_4:H_2O_2:H_2O(1:8:1)$ mixture to uniformly remove the substrate 11 down to a remaining thickness of 20 $\mu$m. The etch rate starts at 25 $\mu$m/min for the first 10 minutes but then slows down to 10 $\mu$m/min. This will also slightly affect the GaAs carrier 27, but the overall result is much better because of the improved removal uniformity. The two processes are non-selective so the total thickness must be monitored to stop before the etch-stop layer 12 is removed.

B. A selective etch of GaAs substrate 11 (over InGaP or InGaAs etch—stop layer 12) was performed. The best selectivity (500) was found for the $H_3PO_4:H_2O_2H_2O$ (3:1:5) mixture. The etch rate was about 2 μm per minute for these technological parameters.

C. A selective etch of InGaP or InGaAs (over GaAs) was performed to remove the etch stop layer 12. The best selectivity was obtained for $CH_2COOH:HCl$ (20:1) solution. 1 minute 30 seconds was enough to remove the 100 nm thick etch stop layer 12. It is to be noted that the clear wax may slightly dissolve and that the BCB 28 may peel off the carrier 27, where not proteced by the multi-layered structure 10. When some wax or unprotected BCB contaminated the surface, the ensemble 30 was removed from the acid mixture and a solvent clean was performed. The contamination can be rinsed, but if not removed, it will act as a protection layer preventing further etching of the etch-stop layer 12.

After substrate 11 removal, the sample was moderately heated on a hotplate to melt the wax and allow of the ensemble 30 detachment from the quartz disc. The back of the ensemble 30 was swabbed and rinsed with appropriate organic solvent to remove any residual wax. The resulting structure is shown in FIG. 6B.

The photolithographic process was then performed aligned to the alignment marks 18 using a photomask defining the "top level" features of waveguide device.

As can be seen, the core layer 16 is easily accessible, as well as the core layer 14, for forming independent optical structures therein which is an advantage of the manufacturing process of the present invention. Similar to the defining of "bottom level" waveguide features, in the forming of "top level" waveguide features, a photoresist layer 31 was deposited on the cleared surface 32 of the cladding layer 13, as shown in FIG. 7A. A respective photomask defining the "top level" waveguide features, aligned to the alignment marks 18, was used to define the "top level" pattern.

After exposure of the photoresist 31, through the mask, and subsequent etching, the photoresist 31 was left in the areas that were intended to form "top level" optical features 33 of the core layer 14. The sample was then etched using ICP etching to a depth of 0.95–1.0 microns using the photoresist 31 as a mask. This etching step removed the cladding layer 13, core layer 14, and a portion of the coupling layer 15 as shown in FIG. 7B to form highly confined waveguide features 33 in the remaining unetched areas of the photoresist layer 31.

After etching, the photoresist 31 was removed using a three-step process similar to that described in previous paragraphs with the reference to the "bottom level" waveguide patterns formation. The sample was then cleaned using a solvent rinse (acetone, methanol and isopropanol). This process was then followed by the application of the adhesion promoter (such as Dow Chemical Company AP3000 Cyclloten adhesion promoter), which was spun at 2000 rpm for a duration of 30 seconds. A drop of BCB (Dow Chemical Cyclotene 3022-57) was applied to the formed sample and spun at 5000 rpm for the duration of 30 seconds to completely encapsulate the formed sample of the integral waveguide device of the present invention.

The encapsulated sample was then cured using the sequence of the temperature and soak regimen similar to that one described in previous paragraphs. After curing, the BCB edge beads were removed using a reactive ion etching process with the device area of the sample shadow masked. The desired result can also be achieved by cleaving away the edge bead region of the formed sample.

The sample was then mounted on a quartz disc with white wax or clear wax, with the device side waxed down to the quartz disc in preparation for cleaning of the carrier 27. The carrier 27 was thinned to a remaining thickness of 110–135 microns using either of the fast etch or a selective etch similar to the technique described in previous paragraphs with regard to removal of the substrate 11. After thinning, the sample was demounted from the quartz disc by moderately heating the same on the hot plate to melt the wax and allow detachment of the sample from the quartz disc. The completely encapsulated optical integrated device 34 is shown in FIG. 7C.

It is to be understood that the devices 34 manufactured by the method of the present invention are suited for large scale silicon integrated circuit fabrication, and therefore, a plurality of such individual optical waveguide devices 34 may be made on the same semiconductor wafer. These wafers can be further cleaved into device bars using standard procedures such as those used for semiconductor laser and waveguide devices. The device bats are then mounted onto brass submounts using silver epoxy, and both facets of the device bars are anti-reflection coated using a well-known electron beam evaporated alumina films technique to suppress facet reflections as known to those skilled in the art.

As described above, the manufacturing process of the present invention provides a way to implement vertical coupling by applying the advantages of projection photolithography, substrate removal and low temperature polymer bonding to achieve vertically coupled, tightly confined single transverse mode couplers, interferometers and ring resonators of high quality.

The process makes possible the fabrication of such single transverse mode, highly confined components using widely available semiconductor processing equipment, such as I-line steppers and reactive ion etching, high density plasma (ECR or ICP) etching or chemically assisted ion beam etching (CAIBE) tools. It further removes the requirement for direct write elecron beam lithography or deep-UV photolithography, which have previously been used for laterally coupled, highly confined components which were necessary to use due to the very small dimension of the lithographically defined lateral coupling gap. Still further the fabrication technique avoids the limitations of resolution and alignment presented by infrared backside-aligned-contact-photolithography which has made single transverse mode highly confined waveguide couplers difficult to realize.

Although the technique of the present invention could also be used with a wafer fusion bonding technique, a method using a polymer bonding technique is shown to achieve very high quality results without the high temperatures typically used to fuse wafers. Additionally, the bonding polymer is used which serves as a low index cladding material. The use of a bonding and substrate removal process for vertically coupled structures provides complete patterning access to both waveguiding layers without incurring the planarization difficulties encountered with a conventional single side patterning and redeposition approach. The invention described herein further extends the fabrication technique to allow the use of conventional projection lithography tools useful for low cost mass production.

Using the fabrication process of the present invention, different optical integrated waveguide structures have been fabricated, particularly vertically coupled microring resonators, such as single mode microring optical channel filters with Q's greater than 3000 and an on-resonance channel distinction greater than 12 db, as well as 1-by-4 multiplexer/demultiplexer crossbar array with second order microring filters exhibiting channel-to-channel crosstalk lower than 10 db.

Similar to the process described in previous paragraphs, with regard to FIGS. 3–7C, the fabrication began with the molecular beam epitaxy epilayer growth. The two 0.5 μm thick GaAs guiding layers were separated with a 0.5 μm Al$_{0.5}$Ga$_{0.5}$As coupling layer. Both guiding layers had a 0.3 μm Al$_{0.5}$Ga$_{0.5}$As top cladding. The In$_{0.48}$Ga$_{52}$P etch-stop layer had 0.1 μm thickness for substrate removal by selective wet etching. In the following steps, a 10×I-line stepper was used for photolithography and the GaAs/AlGaAs features were etched in an inductive coupled plasma (ICP) system for smooth and vertical sidewalls. First, the alignment keys were etched for a depth of 2.1 μm in order to reach the InGaP layer. These keys were then used for processing both sides of the epilayer structure.

Subsequently, the waveguide layer was exposed and etched for a total of 0.95 μm. An organic polymer BCB was used to bond the sample to a GaAs transfer substrate (carrier). The BCB thickness was typically between 1 and 2 μm. The sample substrate was then removed by selective wet etching to the stop etch layer, which was afterwards removed, exposing the second GaAs/AlGaAs layer for processing. The "etched-through" alignment keys were further used to align the microring layer, which was etched for a depth of 0.95 μm. The sample was then encapsulated with BCB to insure refractive index profile symmetry. Finally, the sample was thinned and cleaved for high quality facets and an Al$_2$O$_3$ antireflection coating was deposited on input and output facets.

Figure 8:
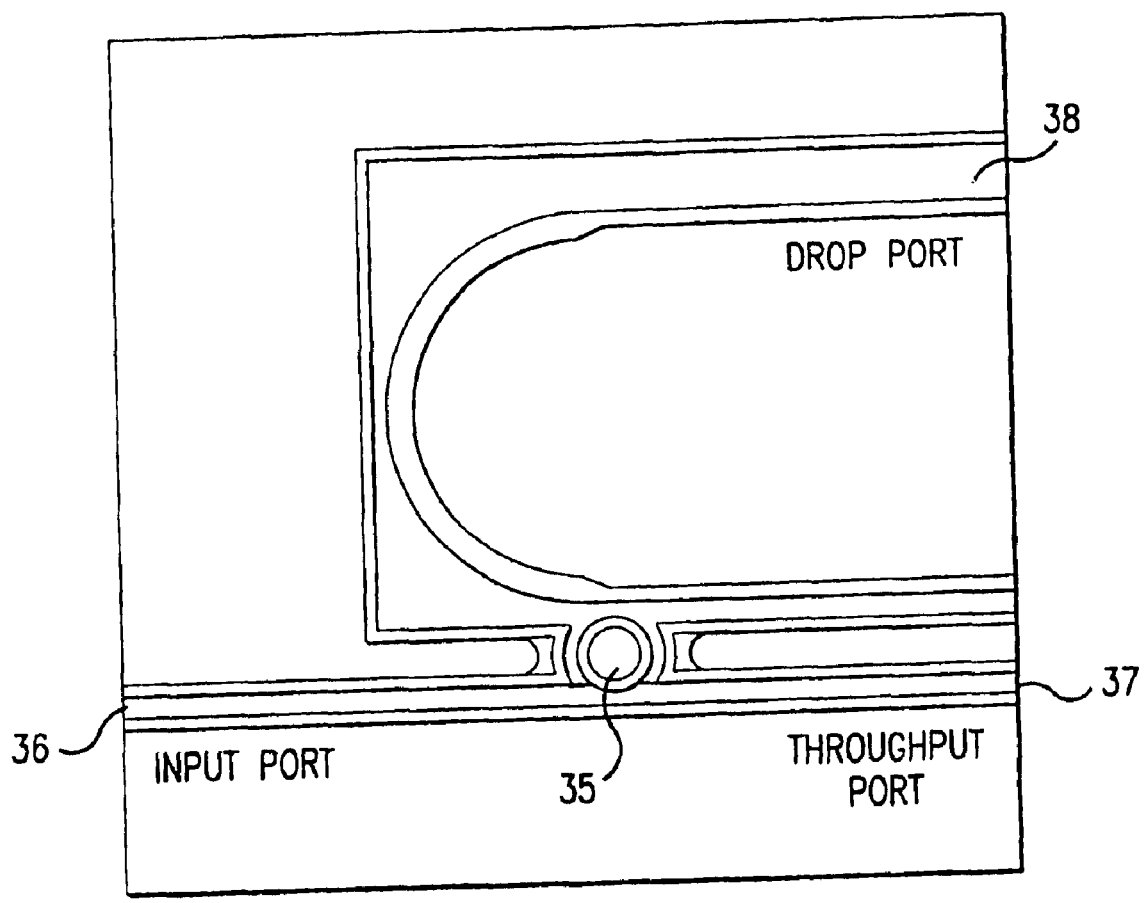
FIG. 8 is a top view of a vertically coupled GaAs/AlGaAs single microring resonator add/drop filter of the present invention.
Figure 9:
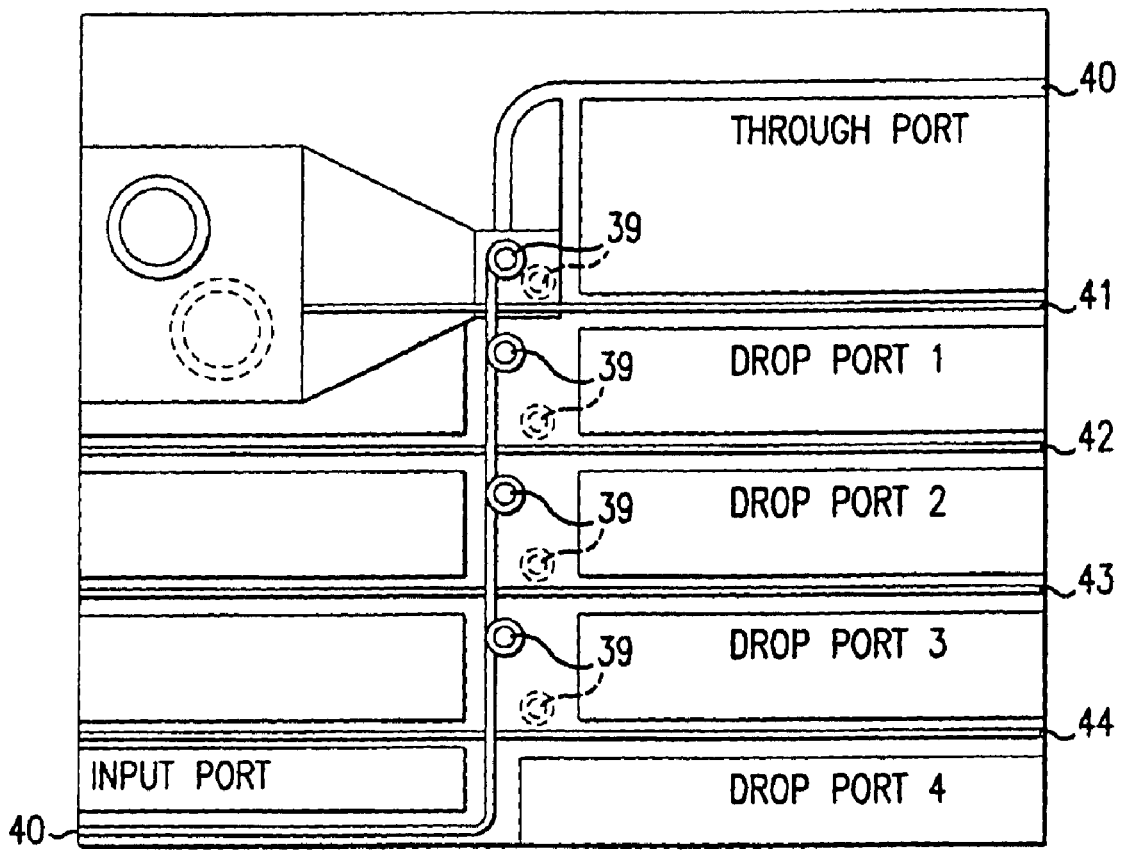
FIG. 9 is a top view of 1-by-4 crossbar MUX/DEMUX with vertically coupled GaAs/AlGaAs double microring resonator of the present invention (the dotted lines show the contours of the underlying guiding structure)

The resulting structure for a single microring optical channel dropping filter is shown in FIG. 8. The filter has a microring 35 (vertically coupled to waveguides positioned on the other level of the structure and thus not seen in the Drawings), input port 36, throughput port 37, and drop port 38. The use of BCB provides a low refractive index (1.53–1.55) layer between the GaAs transfer substrate (carrier) and the epilayer that makes tightly confined waveguides possible on both device layers. Furthermore, the BCB encapsulation provides a symmetric refractive index structure required to have identical microring structures on both layers for multi-ring resonators for example, as shown in FIG. 9. This device has multiple of microrings 39, input port 40, throughport 41, and drop ports 41–44. The waveguides 45 are positioned on the opposite level of the device, and thus, are shown in hidden lines in FIG. 9. A thin (approximately 0.2 μm) AlGaAs coupling layer is left to reduce the effect of layer-to-layer misalignment.

Figure 10:
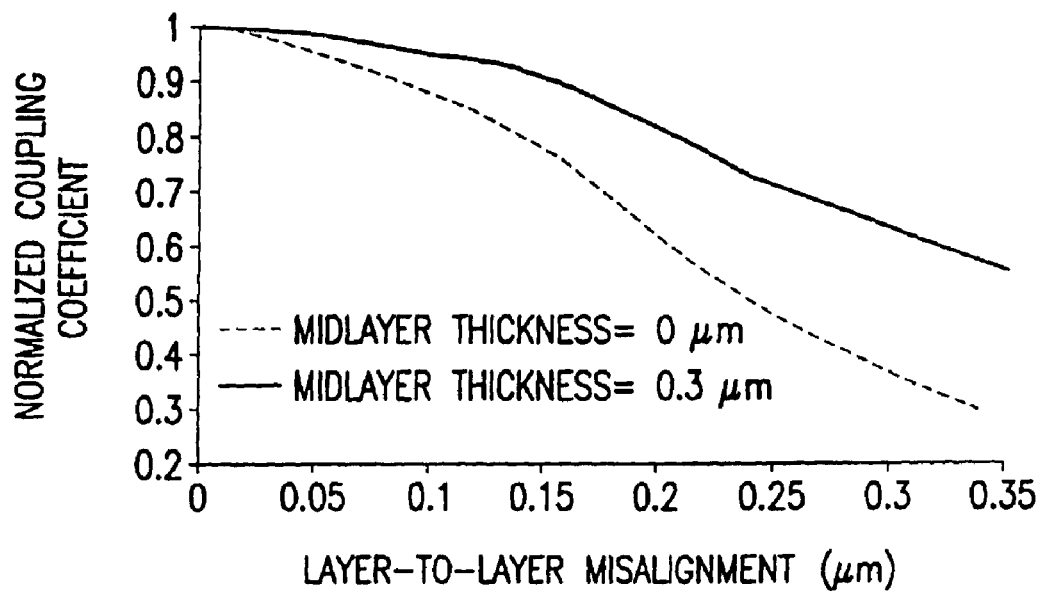
FIG. 10 is a diagram showing a normalized coupling coefficient as a function of the waveguide's misalignment for a) the coupling layer completely removed (dotted line) and for b) the coupling layer of 0.3 micron thickness remained.

FIG. 10 shows the normalized coupling coefficient as a function of the layer-to-layer misalignment based on the mode overlap integral. The design study shows that when a 0.3 μm coupling layer is left, the coupling coefficient drops by 10% for a 0.15 μm misalignment, as opposed to 10% coupling coefficient drop for 0.08 μm misalignment when there is no coupling layer left. However, to limit leakage loss in microrings, 0.3 μm is generally the maximum tolerable thickness one can leave for negligible bending loss. This design also provides added mechanical strength to the structure for the BCB encapsulation. It has been observed experimentally that those areas without the coupling layer undergo stress when the encapsulating BCB is cured at 200° C., so that broken waveguides and microrings may result. Finally, the alignment scheme using a stepper and "etched-through" alignment keys provides for a high quality layer-to-layer alignment with an error kept below 0.25 μm.

Device responses were obtained by coupling light from an external cavity laser diode into the input waveguides and collecting the various outputs with optical fibers. The fabricated devices of FIGS. 8 and 9 have waveguide widths of 0.7 μm and a mid-layer thickness of 0.2 μm. The waveguides are tapered in and out to 2.5 μm width to improve fiber coupling efficiency.

Figure 11:
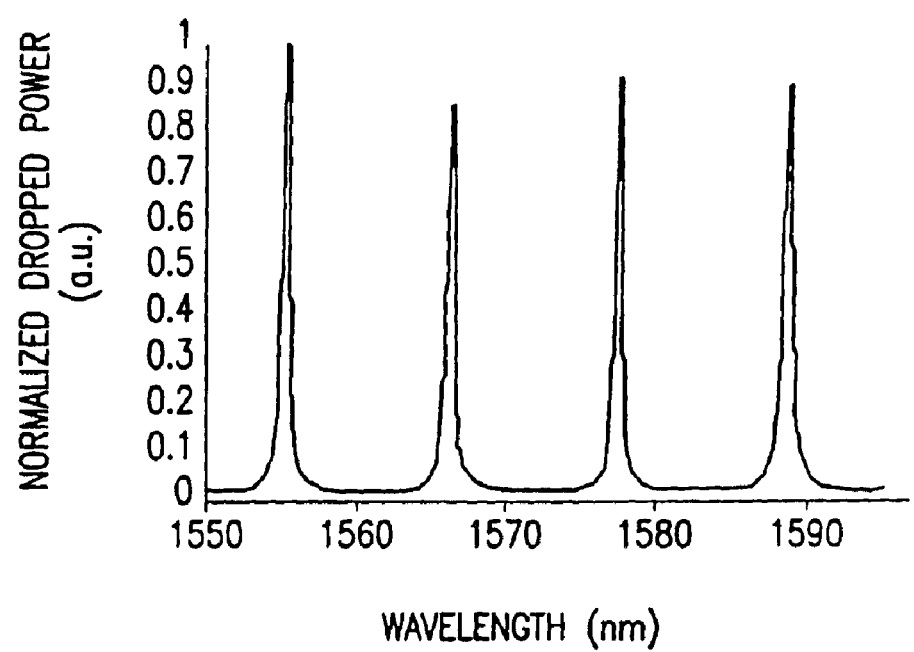
FIG. 11 is a diagram representative of the spectrum of the single microring resonator add/drop filter of FIG. 8.
Figure 12B:
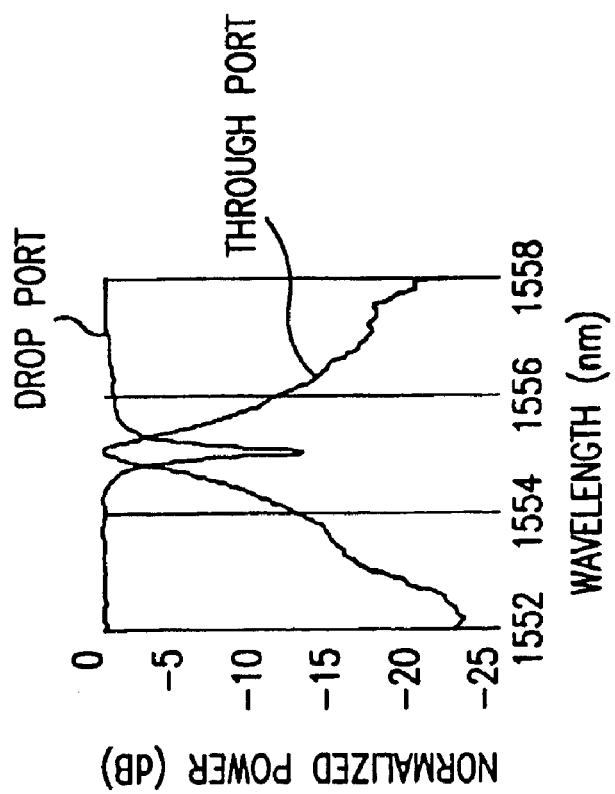
FIGS. 12A and 12B are diagrams representative of normalized power vs. wavelength for fabricated microring resonators of FIG. 8, specifically.
Figure 12A:
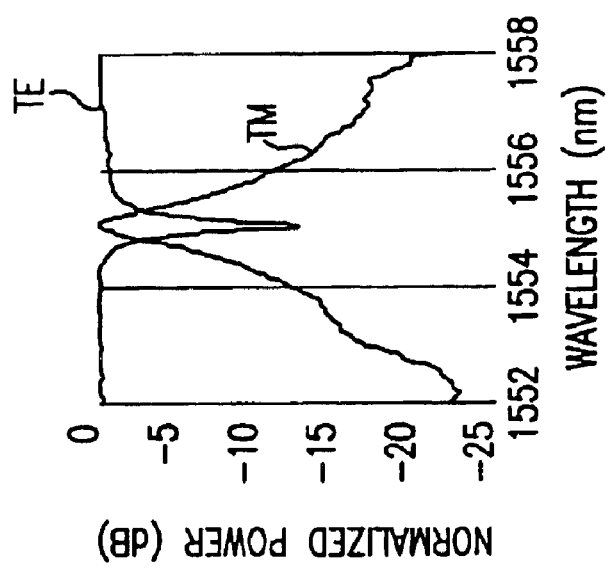

Fabricated single microring resonators of FIG. 8 have radii of 2.5, 5 and 10 μm. Resonant dropped power was observed for all radii, however the 2.5 μm microrings have low Q's due to high round trip loss in the resonators. A wide scan of the 10 μm microring TM spectrum is shown in FIG. 11 that has a Q greater than 3000 and TM and TE bandwidths of 0.5 and 0.59 nm respectively (FIG. 12A). The on-resonance extinction and the dropping efficiency were similar for both TE and TM polarizations. The free spectral range is 11.14 nm for TM and 11 nm for TE. The resonance peak shapes are shown in FIG. 12A, shifted in wavelength. The on-resonance extinction on the throughput port 37 of FIG. 8 is greater than 12 dB (FIG. 12B), and propagation losses in the ring 35 are lower than 17 cm$^{-1}$ for the TM mode. Finally, the dropping efficiency is about 60% for both TE and TM but this measurement assumes reproducible coupling efficiency at the drop port 38 and throughput port 37. All-pass racetrack resonators were also made and exhibited Q's greater than 6000.

A 1-by-4 MUX/DEMUX was fabricated with a crossbar array architecture to optimize device integration. Typically, a tightly confined waveguide crossing suffers from scattering and crosstalk. Since in the architecture of the present invention the waveguides are on different layers, no additional loss was measured experimentally. The crosstalk was smaller than −38 dB. Moreover, double microrings are used as filter blocks for dropping wavelengths with lower channel-to-channel crosstalk due to the sharper roll-off of second-order filters.

Figure 13:
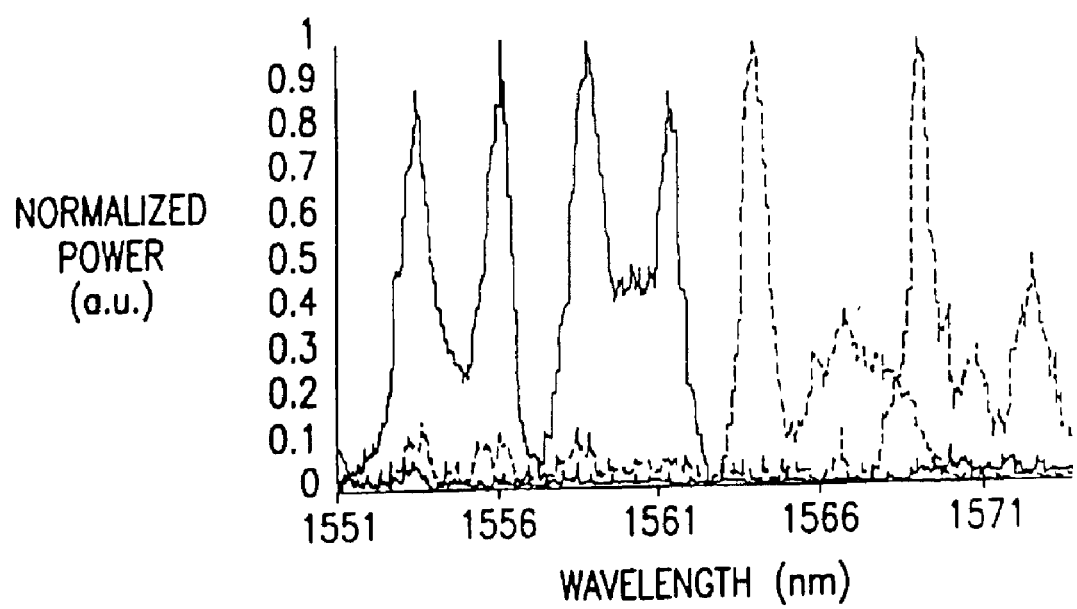
FIG. 13 is a diagram showing a normalized dropped power vs. wavelength in the drop port 1, drop port 2, drop port 3 and drop port 4 of the 1-by-4 MUX/DEMUX of FIG. 9, fabricated in accordance with the present invention.

The results are shown in FIG. 13 measured for the four drop channels 41–44 of FIG. 9. The ring radius was 5 μm with free spectral range of 22.5 nm with a TM bandwidth of 0.9 nm. However, because of fabrication imprecision, the waveguides in the two layers had slightly different widths which resulted in a 3 nm detuning between the upper and lower rings. The resulting second-order resonance is therefore broad and double-peaked. Nevertheless, a second-order roll-off was observed and channel-to-channel crosstalk lower than −10 dB was measured between adjacent channels.

In summary, a new fabrication process has been developed which is used to create working prototypes of vertically coupled microring resonator devices. One of the key improvements over the prior art is the ability to create device patterns using a conventional I-line projection stepper. This allows the production of single transverse mode highly confined waveguides on semiconductors, where the required lateral dimensions are in the submicron range, using a lithography system for large-scale silicon integrated circuit fabrication. The alignment scheme using a stepper and "etched-through" alignment keys provides a high quality layer-to-layer alignment with an error kept below 0.25 μm.

The alignment tolerance issue was addressed in the present invention via a design innovation, whereby the alignment tolerance is greatly increased due to the presence of the coupling layer which was not completely etched through.

The procedure and structure described above achieves additional advantages for high quality device fabrication. The use of a fully symmetric structure with the initial substrate and carrier consisting of identical (or very similar) materials, and symmetric polymer encapsulation contributes to a high quality bonded structure by minimizing stress due to material mismatch.

The symmetric polymer encapsulation also improves the matching of properties of the resonators and waveguides on the two waveguiding layers. Specifically, the new fabrication process has been demonstrated for vertically coupled semiconductor microring resonators in which the mid-layer and the "etched-through" alignment keys helped prevent filter response degradation from layer-to-layer misalignment. Moreover, the refractive index profile symmetry of the bonded and encapsulated epilayer structure permits the use of tight confinement on both waveguiding layers which makes possible the fabrication of identical resonators for high-order filtering. High-Q microrings and a 1-by-4 MUX/DEMUX crossbar array exhibiting a sufficient second-order demultiplexing response, were fabricated using the technique of the present invention.

The low index polymer undercladding provides the additional benefit of reducing leakage loss of light into the carrier material. However, the concepts for alignment marks and alignment tolerant design described herein may also be implemented in non-polymer substrate-removal device fabrication processes which use direct wafer bonding or fusing techniques.

A number of advantages of the vertical coupling design approach that apply to the implementation of the present invention are as follows:

1. The higher degree of vertical confinement and isolation from the substrate relative to prior lateral coupling design allows a reduction in the etching depth required for low optical radiation loss. The reduction of etching depth reduces the amount of etch mask erosion during the waveguide-defining etch process, potentially reducing the etched sidewall roughness and optical scattering loss.

2. The design geometry is favorable to creating active devices with electrodes to contact doped regions used in electro-optic or gainproducing structures. The remaining coupling layer described above lends the additional advantage of providing a surface to use for electrically contacting the coupling layer, which could be doped. Contacts could be created in the open regions adjacent to unetched ridge structures.

3. The structure allows each of the two waveguiding cores to be individually optimized in dimension and composition for its particular function. For example, one core may be active with the other being passive.

As described above, the invention described herein permits an easier and higher quality implementation of vertically coupled devices in highly confined optical waveguides. Although this invention has been implemented and demonstrated to work in a single material system, it equally may be implemented in a number of optical waveguiding materials systems where high quality tightly confined waveguides can be made and where suitable bonding agents and selective etching recipes exist. The combination of the new alignment mark creation method for substrate removal processes and the increased alignment tolerance of the device design with a remaining mid-layer makes it possible to fabricate vertically coupled, highly confined, single transverse mode optical waveguide devices with conventional projection lithography in a process compatible with low cost mass production.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method for fabrication of vertically coupled integrated photonics devices, including the steps of:

(a) forming a multi-layered structure having first and second levels and comprising: at least a first and a second waveguiding core layers, a coupling layer disposed between said at least first and second waveguiding core layers, and first and second cladding layers sandwiching said waveguiding core layers therebetween;

(b) forming alignment marks extending substantially through said multi-layered structure at predetermined areas thereof, (c) forming first features at said first level of said multi-layered structure, said first features extending through said first cladding, said first waveguiding core layer and partially through said coupling layer; and (d) forming second features at said second level of said multi-layered structure, said second features extending through said second cladding, said second waveguiding core layer and partially through said coupling layer; whereby said first and second features are disposed at predetermined location with reference to said alignment marks identifiable at both said first and second levels of said multi-layered structure.

2. The method of claim 1, wherein in said steps (c) and (d), said first and second features are defined by means of a projection lithography technique.

3. The method of claim 2, wherein in either of said steps (c) and (d), said projection lithography technique comprising the steps of:

depositing a photoresist on the external surface of a respective one of said cladding layers, exposing said photoresist through a projection stepper prealigned with respect to said alignment marks, and patterning a respective one of said waveguiding core layers.

4. The method of claim 3, further comprising the steps of:

patterning said respective waveguiding core layer by means of etching through said respective cladding layer, said respective waveguiding core layer, and through portion of said coupling layer.

5. The method of claim 1, further comprising the steps of:

in said steps (c) and (d), penetrating into said coupling layer to a predetermined depth to leave a portion of said coupling layer separating first and second features defined in said first and second waveguiding core layers, respectively.

6. The method of claim 5, wherein said portion of said coupling layer is thinner than 0.3 $\mu$m.

7. The method of claim 1, further comprising the steps of:

forming said multi-layered structure on a surface of a substrate structure, said substrate structure comprising a substrate layer and a stop-etch layer positioned between said substrate layer and a respective one of said cladding layers.

8. The method of claim 7, further comprising the steps of:

subsequent to the completion of said step (c), adhering said multi-layered structure to a carrier structure in a predetermined alignment therewith with said first features extending towards said carrier structure.

9. The method of claim 8, wherein in the step of adhering, said multi-layered structure is adhered to said carrier by a low temperature polymer bonding.

10. The method of claim 9, wherein in said low temperature polymer bonding, said polymer is benzocyclobutene polymer.

11. The method of claim 8, further comprising the steps of:

(E) upon completion of said step (d), removing said substrate structure.

12. The method of claim 11, further comprising the steps of:
performing said step (e) after completion of said step (b);
encapsulating said second level of said multi-layered structure into a polymer, and
removing said carrier.

13. The method of claim 7, further comprising the steps of:
after said step (b), forming metal films on said stop-etch layer within said alignment marks.

14. A vertically coupled integrated photonics device, comprising:
a multi-layered structure including:
(a) at least a pair of waveguiding core layers independently patterned to define respectively first and second waveguiding features therein,
(b) a coupling layer spacing said first and second waveguiding features,
(c) a pair of cladding regions sandwiching said first and second waveguiding features therebetween,
(d) a pair of spaced alignment marks extending through at least one of said cladding layers, at least one of said waveguiding core layers, and at least partially through said coupling layer, said first and second waveguiding features being located with respect to said alignment marks for acurate positioning of one with respect to the other, and
(e) a polymer envelope encapsulating said multi-layered structure therewithin.

15. The vertically coupled integrated photonics device of claim 14, wherein the thickness of said coupling layer is less than approximately 0.3 μm.

16. The vertically coupled integrated photonics device of claim 14, wherein said first waveguiding features include at least one microring.

17. The vertically coupled integrated photonics device of claim 14, wherein said device includes a single microring resonator add/drop filter.

18. The vertically coupled integrated photonics device of claim 14, wherein said device includes a double microring resonator.

19. The vertically coupled integrated photonics device of claim 14, wherein said device includes GaAs/AlGaAs materials systems.

20. The vertically coupled integrated photonics device of claim 14, wherein said polymer envelope has a low refractive index in the range of 1.53–1.55.

* * * * *